United States Patent [19]

Kitai et al.

[11] 4,212,522
[45] Jul. 15, 1980

[54] SHUTTER CONTROL DEVICE FOR AUTOMATIC FOCUSING CAMERA

[75] Inventors: Kiyoshi Kitai; Yukio Morino; Shogo Kato; Ichiro Nemoto, all of Shikawatashi, Japan

[73] Assignee: Seiko Koki Kabushiki Kaisha, Tokyo, Japan

[21] Appl. No.: 961,731

[22] Filed: Nov. 17, 1978

[30] Foreign Application Priority Data

Nov. 18, 1977 [JP] Japan .................. 52-138736

[51] Int. Cl.² .................. G03B 7/08; G03B 9/08
[52] U.S. Cl. .................. 354/25; 354/234
[58] Field of Search .......... 354/25, 234, 195, 235, 354/30-35, 38, 230

[56] References Cited

U.S. PATENT DOCUMENTS

| | | | |
|---|---|---|---|
| 3,479,943 | 11/1969 | Goshima | 354/25 |
| 3,529,528 | 9/1970 | Leitz | 354/25 |
| 3,535,989 | 10/1970 | Kitai | 354/32 |
| 3,611,895 | 10/1971 | Von Albedyll | 354/32 |
| 3,662,664 | 5/1972 | Goshima | 354/230 |
| 3,683,777 | 8/1972 | Miyagawa | 354/25 |
| 3,947,858 | 3/1976 | Ishida | 354/234 |

*Primary Examiner*—Donald A. Griffin
*Attorney, Agent, or Firm*—Robert E. Burns; Emmanuel J. Lobato; Bruce L. Adams

[57] ABSTRACT

In an automatic focusing camera having a shutter control member for controlling the shutter mechanism and a focusing member for regulating the position of the camera lens, an actuating member is provided for controlling the focusing member and the shutter control member. The actuating member is a single slidably mounted element which is movable between a charged position and a rest position and is biased into the rest position. The actuating member actuates the focusing member in the initial stage of movement from the charged position to the rest position and actuates the shutter control member in the final stage of the movement to the rest position.

3 Claims, 2 Drawing Figures

SHUTTER CONTROL DEVICE FOR AUTOMATIC FOCUSING CAMERA

BACKGROUND OF THE INVENTION

This invention relates to a shutter control device for an automatic focusing camera, more particularly to a shutter control device wherein an actuating member controlling a shutter blade control member is adapted so as to actuate the photographic lens system or the focusing member in the initial stage of its operation.

In the conventional device, there are provided a charging member for charging the photographic lens system or the focusing member and a combination of an electromagnet and an actuating member for actuating a shutter blade control member to operate the shutter blade. The charging member, retained together with the actuating member by an electromagnet, is allowed to move in a body with the actuating member which starts the sliding movement when the shutter button is depressed, then when the electromagnet is demagnetized by a signal given by the focus detection module, the retention by the charging member is cancelled so that the photographic lens system or the focusing member is stopped to fix the photographic lens at the focus position, then the shutter blade control member is actuated according to the successive movement of the actuating member. Consequently, the construction of the device is complicated requiring the charging member for charging the photographic lens system or the focusing member, the actuating member for controlling the shutter blade control member and parts for interlocking said members, therefore, the conventional device is disadvantageous with respect to its size and manufacturing cost.

SUMMARY OF THE INVENTION

Accordingly, it is an object of the present invention to provide an improved shutter control device wherein there is provided a single actuating member having a portion for operating the photographic lens system or the focusing member and a cam portion for controlling the shutter blade control member which operates the shutter blade. The actuating member is adapted to actuate the photographing lense system or the focusing member and the shutter blade control member in the initial stage and the final stage, respectively, of its return travel to the rest position pulled by a spring, therefore, the shutter control device of the present invention is simply constructed, needless of complicated interlocking meechanisms, reduced in manufacturing cost and dimensionally advantageous.

DETAILED DESCRIPTION OF THE INVENTION

Figure 1:
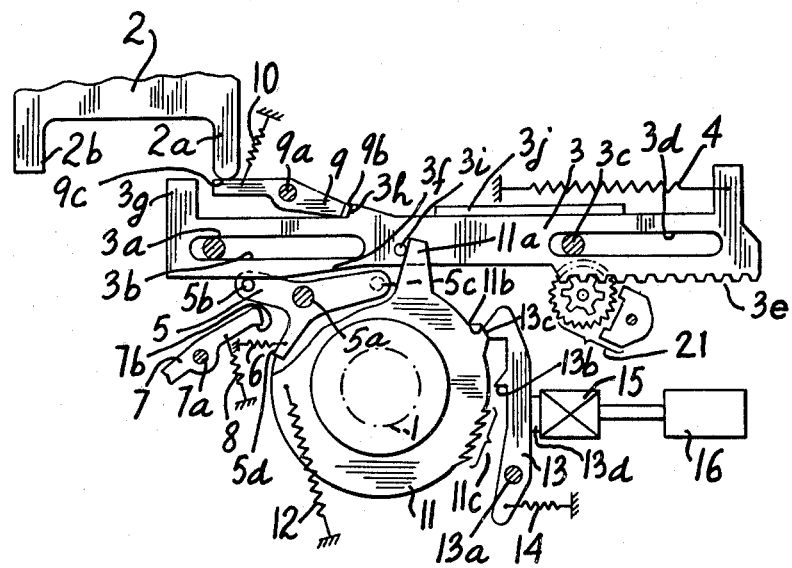
FIG. 1 is a schematic plan view of a preferred embodiment in the charge state according to the present invention.

Referring to FIG. 1 illustrating the plan view of a preferred embodiment of the present invention in charged state, the aperture (1) is coaxial with the optical axis of the photographic lens. A release member (2) haaving arms (2a) and (2b) is disposed on the base plate, not shown, and is urged upwards by a spring, not shown. An actuating member (3) having a cam portion (3f), an arm (3g) which hits against the arm (2b) only when the release member (2) is depressed, a detent receiving part (3h), a pin (3i) and a raised end (3j), is slidably guided by fixed pins (3a) and (3c) fitted within slots (3b) and (3d), respectively, and is urged leftwards by a spring (4). A shutter blade control member (5) having a pin (5b) which follows the cam portion (3f) of the actuating member (3), shutter blade operating pin (5c), and an arm (5d) is reciprocable about a fixed pin (5a) and is urged clockwise by a spring (6). A shutter blade closing motion actuating member (7) having an arm (7b) is reciprocable about a fixed pin (7a) and is urged counterclockwise by a spring (8). A detent (9) having an arm (9c) touching the arm (2a) of the release member (2) and a raised end (9b) retaining the actuating member (3) at the detent receiving part (3h) is reciprocable about a fixed pin (9a) and is urged clockwise by a spring (10). A focusing member (11), for regulating the position of the photograhic lens, having an arm (11a) touching the pin (3i) of the actuating member (3), a protrusion (11b) and ratchets (11c), is rotatable coaxially with the aperture (1) and is urged counterclockwise by a spring (12). An armature lever (13) having a pawl (13b) for engagement with the ratchets (11c) of the focusing member (11), an arm (13c) at which the armature lever (13) is pressed against an electromagnet (15) by the protrusion (11b) immediately before the completion of charging of the focusing member (11) and a magnetic piece (13d), is reciprocable about a pivot (13a) and is urged counterclockwise by a spring (14). Numeral (16) designates a known focus detection module.

Figure 2:
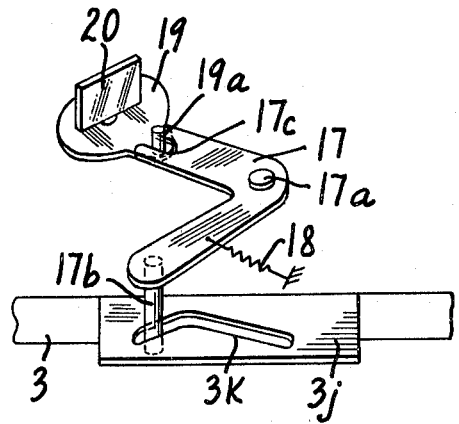
FIG. 2 illustrates in perspective a mechanism for actuating a movable mirror to perform focus position scanning motion.

Referring to FIG. 2 illustrating in perspective a mechanism for actuating the movable mirror to perform focus position scanning motion in the state as shown in FIG. 1 the raised portion (3j) of the actuating member (3) has a groove (3k). An interlocking lever (17) has a pin (17b) fitting within the groove (3k) of the actuating member (3) and a slitted end (17c) is reciprocable about a pivot (17a) and urged counterclockwise by a spring (18). A mirror lever (19) is fixedly provided with a movable mirror (20) and a pin (19a) engaging with the slit of the slitted end (17c) and is reciprocable about a pivot, not shown.

In operation, when the shutter release button is depressed while directing the camera towards the photographic object, the release member (2) is depressed to push the detent (9) at the arm (9c) with the arm (2a) so that the detent (9) is turned counterclockwise. Consequently, the retention of the actuating member (3) at the detent receiving part (3h) by the raised end (9b) of the detent (9) is cancelled, then the actuating member (3) starts moving leftwards. At the initial stage of the leftward movement of the actuating member (3), the movable mirror (20) is turned clockwise by the groove (3k) of the actuating member (3) through the interlocking motion as shown in FIG. 2, while the distance between the camera and the photographic object detected by this scanning motion is memorized by the focus detection module (16). According to the further leftward movement of the actuating member (3), the focusing member (11) is allowed to turn counterclockwise as the arm (11a) of the focusing member (11) follows the pin (3i) of the actuating member (3) and the protrusion (11b) of the focusing member (11) escapes from the arm (13c) of the armature lever (13) cancelling the pressing of the armature lever (13) against the electromagnet (15), yet the armature lever (13) remains attracted by the electromagnet (15) as the electromagnet (15) is magnetized. Meanwhile, the movable mirror (20) starts turning clockwise according to the further leftward movement of the actuating member and operated by the groove (3k) of the actuating member (3) and when the movable mirror (20) is turned to the position corresponding to the previously memorized position, the electromagnet (15) is demagnetized so that the armature lever (13) is allowed to turn counterclockwise, then the pawl (13b) engages with the ratchet (11c) of the focusing member (11) to stop the counterclockwise rotation of the focusing member (11). As the further leftward movement of the actuating member (3), the pin (5b) moves upwards following the cam portion (3f), consequently, the the shutter blade control member (5) turns clockwise about the pivot (5a) and the pin (5c) actuates the shutter blade, not shown, to open same. After a fixed period of time, a known exposure control module, not shown, actuates an electromagnet device to permit clockwise rotation of the closing lever (7). According to the clockwise rotation of the closing lever (7), the arm (7b) of the closing lever (7) turns the shutter blade control member (5) counterclockwise engaging with the arm (5d) so that the shutter blade, not shown, is operated so as to close the aperture and to complete the exposure. The actuating member (3) moves leftwards still further until finally the arm (3g) of the actuating member (3) hits against the arm (2b) of the release member (2). When the depression of the release member (2) is cancelled after the exposure has been completed, the release member (2) returns to its original resing position pulled by a spring, not shown, then the arm (2b) of the release member (2) escapes from the engagement with the arm (3g) of the actuating member (3) so that the actuating member (3) moves rightwards abgain to cancel a known film winding locking motion.

The provision of a rack (3e) on the actuating member (3) and a delay device (21) provided on the base plate, not shown, and engaged with the rack (3e), will brake the movement of the focusing member (11), because the focusing member (11) is allowed to turn as the arm (11a) follows the pin (3i) of the actuating member (3), consequently, the shock of stopping of the focusing member (11) by the engagement of the pawl (13b) of the armature lever (13) with the ratchet (11c) of the focusing member (11) is reduced, meanwhile, the braking of the focusing member (11) compensates the mechanical delay, the so-called mg delay, resulting from the procedure wherein the armature lever (13) turns counterclockwise when the electromagnet (15) is demagnetized to stop the focusing member (11) by the engagement of the pawl (13b) with the ratchet (11c), in addition, the braking of the actuating member (3) is effective in constituting a shutter blade control mechanism for a program shutter system wherein the shutter blade operating curve is modified by controlling the clockwise rotation of the shutter blade control member (5) by properly designing the inclination of the cam portion (3f) of the actuating member (3).

Although the focus detection signal is provided by means of a reciprocation of the movable mirror (20) in the preferred embodiment as described above, it is to be understood that the object of the invention is attained if the focus detection signal is provided by some means other than the reciprocation of the movable mirror (20).

It may be well understood from what has been described hereinbefore that the present invention provides a shutter blade control device which is simply constructed, without the need of complicated interlocking mechanisms and having a reduced manufacturing cost as the operation of the photographic lens system or the focusing member and the actuation of the shutter blade control member are controlled by a single actuating member. Furthermore, the shutter blade control device of the present invention effectively applies to a flat type camera, such as 110 type camera, requiring a long charging stroke and a thinly constructed mechanism.

We claim:

1. A shutter control device for an automatic focusing camera capable of automatically focusing a photographic lens by a system actuated by a signal produced by a focus detection module when the distance between the photographic object and the camera is detected, the device comprising a shutter control member which controls the operation of a shutter blade, a focusing member for regulating the position of the photographic lens, and a single slidably mounted actuating member having a cam portion for controlling said shutter control member and a spring biasing the actuating member into its rest position such that said actuating member actuates said focusing member and said shutter blade control member in the initial stage and the final stage, respectively, of the return travel thereof to the rest position.

2. In an automatic focusing camera having a shutter control member for controlling the shutter mechanism and a focusing member for regulating the position of the camera lens, the improvement comprising: means for controlling the focusing member and the shutter control member comprising a single slidably mounted actuating member movable between a charged position and a rest position, means biasing the actuating member into the rest position and wherein the actuating member actuates the focusing member in the initial stage of movement from the charged position to the rest position and actuates the shutter control member in the final stage of the movement to the rest position.

3. The camera according to claim 2, wherein the shutter control member comprises a pivotally mounted lever having a pin thereon, the focusing member comprises a rotatable circular element having an arm thereon, and wherein the actuating member comprises a cam surface engaged with the pin and a pin engaged with the arm.

* * * * *